(12) United States Patent
Buckman et al.

(10) Patent No.: US 7,095,715 B2
(45) Date of Patent: Aug. 22, 2006

(54) SYSTEM AND METHOD FOR PROCESSING NETWORK PACKET FLOWS

(75) Inventors: Charles R. Buckman, Austin, TX (US); Dennis J. Cox, Austin, TX (US); Donovan M. Kolbly, Austin, TX (US); Craig S. Cantrell, Austin, TX (US); Brian C. Smith, Fort Worth, TX (US); Jon H. Werner, Austin, TX (US); Marc Willebeek-LeMair, Austin, TX (US); Joe Wayne Blackard, Austin, TX (US); Francis S. Webster, III, Austin, TX (US)

(73) Assignee: 3Com Corporation, Marlborough, MA (US)

( * ) Notice: Subject to any disclaimer, the term of this patent is extended or adjusted under 35 U.S.C. 154(b) by 956 days.

(21) Appl. No.: 09/897,189

(22) Filed: Jul. 2, 2001

(65) Prior Publication Data

US 2003/0012147 A1    Jan. 16, 2003

(51) Int. Cl.
*G01R 31/08* (2006.01)
*H04L 12/28* (2006.01)

(52) U.S. Cl. .................. 370/230; 370/392; 370/401
(58) Field of Classification Search ............ 370/389, 370/392, 400, 401, 428, 474, 466, 412, 230, 370/235, 263; 713/150, 153, 154, 160; 709/224, 230, 236
See application file for complete search history.

(56) References Cited

U.S. PATENT DOCUMENTS

| | | | |
|---|---|---|---|
| 651,636 A | 6/1900 | McCarthy | 52/54 |
| 5,101,402 A | 3/1992 | Chiu et al. | 709/224 |
| 5,648,965 A | 7/1997 | Thadani et al. | 370/241 |
| 5,742,772 A | 4/1998 | Sreenan | 709/226 |
| 5,787,253 A | 7/1998 | McCreery et al. | 709/231 |
| 5,835,726 A | 11/1998 | Shwed et al. | 709/229 |
| 5,845,267 A | 12/1998 | Ronen | 705/40 |
| 6,028,842 A * | 2/2000 | Chapman et al. | 370/235 |
| 6,091,709 A * | 7/2000 | Harrison et al. | 370/235 |
| 6,104,700 A * | 8/2000 | Haddock et al. | 370/235 |
| 6,108,700 A | 8/2000 | Maccabee et al. | 709/224 |
| 6,172,990 B1 * | 1/2001 | Deb et al. | 370/474 |
| 6,212,559 B1 | 4/2001 | Bixler et al. | 709/221 |
| 6,262,983 B1 * | 7/2001 | Yoshizawa et al. | 370/389 |
| 6,286,030 B1 | 9/2001 | Wenig et al. | 709/203 |
| 6,292,489 B1 * | 9/2001 | Fukushima et al. | 370/401 |

(Continued)

OTHER PUBLICATIONS

PacketShaper Enterprise Solutions; Packeteer, Inc. (www.packeteer.com).
Network-Based Application Recognition, Release 12.0(5)XE2, 12.1(1)E and 12.1(2)E, Cisco Systems (www.cisco.com).

*Primary Examiner*—Doris H. To
*Assistant Examiner*—Ian N. Moore
(74) *Attorney, Agent, or Firm*—Hamilton & Terrile, LLP

(57) ABSTRACT

A system and method provides a broadband network node for a best effort network such as the Internet or intranets which supports the inexpensive and rapid deployment of services to the best efforts network. Separate data path and control path mechanisms allow high-speed data transfers with parallel processing flows for the data path that are controlled across data flows by the control path. Packets are classified, modified and shaped to enable the service on the network with an accountant to track packet traffic for control and billing purposes. A series of processing blades perform a modification function for each blade that processes packets according to classifications. The processing blades are modular and scalable for insertion in the broad band switch to rapidly adapt the broadband network node for new services.

5 Claims, 1 Drawing Sheet

U.S. PATENT DOCUMENTS

| | | | |
|---|---|---|---|
| 6,320,848 B1* | 11/2001 | Edwards et al. | 370/255 |
| 6,418,125 B1* | 7/2002 | Oran | 370/266 |
| 6,452,915 B1 | 9/2002 | Jorgensen | 370/38 |
| 6,542,466 B1* | 4/2003 | Pashtan et al. | 370/235 |
| 6,560,233 B1* | 5/2003 | Hatanaka et al. | 370/401 |
| 6,590,885 B1 | 7/2003 | Jorgensen | 370/338 |
| 6,594,246 B1 | 7/2003 | Jorgensen | 370/338 |
| 6,628,617 B1* | 9/2003 | Karol et al. | 370/237 |
| 6,628,629 B1 | 9/2003 | Jorgensen | 370/322 |
| 6,636,481 B1* | 10/2003 | Yamaguchi et al. | 370/230 |
| 6,640,248 B1 | 10/2003 | Jorgensen | 709/226 |
| 6,680,922 B1 | 1/2004 | Jorgensen | 370/328 |
| 6,697,368 B1* | 2/2004 | Chang et al. | 370/395.1 |
| 6,711,165 B1* | 3/2004 | Tzeng | 370/392 |
| 6,714,517 B1* | 3/2004 | Fawaz et al. | 370/236 |
| 6,772,223 B1 | 8/2004 | Corl et al. | 709/238 |
| 6,801,530 B1* | 10/2004 | Brandt et al. | 370/392 |
| 6,804,240 B1* | 10/2004 | Shirakawa et al. | 370/392 |
| 6,826,147 B1* | 11/2004 | Nandy et al. | 370/229 |
| 6,831,893 B1* | 12/2004 | Ben Nun et al. | 370/235 |
| 6,865,602 B1 | 3/2005 | Nijemcevic et al. | 709/223 |
| 6,892,233 B1 | 5/2005 | Christian et al. | 709/223 |
| 2002/0085560 A1* | 7/2002 | Cathey et al. | 370/392 |
| 2002/0099854 A1 | 7/2002 | Jorgensen | 709/249 |
| 2002/0107908 A1* | 8/2002 | Dharanikota | 709/203 |
| 2002/0152303 A1 | 10/2002 | Dispensa | 709/224 |
| 2002/0191622 A1* | 12/2002 | Zdan | 370/401 |
| 2002/0194369 A1* | 12/2002 | Rawlins et al. | 709/238 |
| 2003/0005144 A1 | 1/2003 | Engel et al. | 709/235 |
| 2003/0014627 A1* | 1/2003 | Krishna et al. | 713/153 |
| 2003/0028624 A1 | 2/2003 | Hasan et al. | 709/220 |
| 2003/0067903 A1 | 4/2003 | Jorgensen | 370/338 |
| 2003/0076855 A1 | 4/2003 | Chamberlain | 370/447 |
| 2004/0022237 A1 | 2/2004 | Elliott et al. | 370/356 |
| 2004/0088646 A1 | 5/2004 | Yeager et al. | 715/500 |
| 2004/0098447 A1 | 5/2004 | Verbeke et al. | 709/201 |

* cited by examiner

SYSTEM AND METHOD FOR PROCESSING NETWORK PACKET FLOWS

TECHNICAL FIELD OF THE INVENTION

This invention relates generally to computer networks, and more specifically relates to a system and method for processing packet flows through a network.

BACKGROUND OF THE INVENTION

The Internet has grown in popularity largely because it provides a simple and uniform underlying packet protocol for exchanging data that in turn enables more complex applications to occur. The relative simplicity of the Internet has lead to an explosion of growth in data traffic for business and personal usage. An industry of Internet service providers (ISP) has developed to provide access to the Internet for businesses and homes. These ISPs have invested heavily in infrastructure with the general goal of improving data transfer rates for customer end points. Thus, ISPs have evolved from low speed analog modem Internet connections provided through dial-up service across the plain old telephone system (POTS) into broadband access provided by cable modems, DSL, and ADSL that are capable of transferring data at substantially higher rates.

Internet access offered by ISPs has become a commodity service with different ISPs typically offering similar access speeds and competing on price points. However, as ISPs gain subscribers to their high-speed broadband access services, the reliability of ISP service, i.e. the ability to transfer data at predictable rates, available at end points has suffered and indeed is often less than the capacity of broadband customer modems. For instance, surges in subscriber use tends to create bottlenecks that slow data transfer rates and use ISP infrastructure inefficiently. This difficulty relates generally to the Internet's architecture which transfers data on a "best effort" basis in which TCP/IP packets are generally transferred between routing points without prioritization. This "best effort" architecture is attractive for its simplicity, but creates difficulties for ISPs who desire to distinguish themselves based on the services offered compared to other ISPs.

One manner in which ISPs are working to distinguish themselves is to offer subscribers different types of services. In general terms, a service is the processing of certain data on the network in a predetermined manner with associated billing. For instance, one service typically offered by telephone network providers is call waiting, in which customers receive notice of an incoming telephone call when the customer is on the phone for a monthly fee. A typical service offered by ISPs is e-mail service, although e-mail service is not typically billed. Typically e-mail service is provided by routing e-mails to an ISP server that stores the e-mails until the subscriber retrieves them.

More complex services are generally difficult to implement on a best effort network architecture, such as the Internet, since best effort networks are generally designed to route packets to destinations on a first come first served basis. An ISP that seeks to provide a new service to its subscribers has to design and install hardware and software that generally require a considerable capital investment and time to develop. Even after investing considerable time and capital in the development of a new service, subscriber needs and technology often advance more rapidly than a service deployment cycle, frequently leaving newly deployed services out of date before the services become a revenue source or market differentiator for the ISP. Thus, ISPs who attempt to lead the market by developing and offering new services face considerable risk if a large investment in a new service fails to result in greater revenue or customer satisfaction.

SUMMARY OF THE INVENTION

Therefore a need has arisen for a system and method which processes network packet flows in a best effort network with scalable and flexible hardware and software architecture.

A further need has arisen for a system and method which supports rapid deployment of services in a best effort network with reduced expense and complexity.

In accordance with the present invention, a system and method is provided that substantially eliminates or reduces disadvantages and problems associated with previously developed systems and methods for processing network packet flows in a best effort network. A network node provides a data path that performs repetitive operations at high speeds to classify, process and shape packets according to a slower speed control path that performs complex logic operations associated with predetermined services. Processing blades interfaced with the data flow receives predetermined packets based on classification and modifies the packets for transmission across the network.

More specifically, packets received by the network node are classified according to a set of classification rules. The classification rules sort the packets into packet groups and each packet group is sent to a predetermined input port of a modify\process engine. The modify\process engine performs multithreaded processing with a function associated with each input port. This highly parallel implementation in which internal state is not shared among functions allows the network node switch to perform repetitive operations at high speeds for processing packet flows. The modify\process engine sends packets to a shaper engine which controls the transmission of the packets with queuing disciplines for transmission to the network. An accountant engine tracks statistics in the classify, modify\process and shaper engines for control and billing purposes. A controller programs the classify, modify\process, shaper and accountant engines to achieve a desired packet prioritization and flow. For instance, the controller installs or modifies rules in the classify engine, installs or modifies functions in the modify\process engine, establishes queues in the shaper engine and determines the variables or tracking in the accountant engine.

In one embodiment, packet flows are controlled by packet processing behaviors that are specified with a dataflow program and reflective programming. The dataflow program specifies interconnected objects for the data to flow through. For instance, one packet processing behavior of a service in a dataflow representation creates a queue for a new TCP connection. The dataflow program detects SYN packets of new TCP connections and, when a new connection is detected, a new dataflow program is constructed using reflective programming that contains elements to detect the host/port quadruple of the new flow. Thus, bandwidth may be dynamically assigned for new connections.

The modify\process engine includes an interface with a blade bus adapted to accept processor blades programmed to modify packets. Each processor blade performs a function on packets received and then forwards the modified packet to the shaper engine for transmission on the network. Each processing blade is designed for a specific function to enable complex operations with minimal delay. The processing blade architecture provides a scalable broadband network node that is easily adapted to support new services with reduced complexity and increased speed. For instance, a broadband network node programmed to classify packets for supporting a voice over internet protocol (VOIP) is adapted to support a conference call service by interfacing a processing blade with the processor blade bus so that packets classified as conference call VOIP packets are mixed as audio streams with the processing blade.

The present invention provides a number of important technical advantages. One important technical advantage is the inexpensive and rapid deployment of new and modified services in a best effort network. The classification, modification and shaping of packets is performed at line speed by software residing on function specific hardware. Flexibility is provided to add and modify services through software programming and the addition of appropriate hardware processing blades. Thus, the broadband network node provides a flexible and scalable solution for routing packets in a best effort network according to the packet's associated applications.

Another important technical advantage of the present invention is that bandwidth is dynamically allocated for packet flows using reflective programming techniques in the context of dataflow programs. This allows the network to adapt as the type of data across the network changes over time, resulting in improved efficiency and flexibility in bandwidth usage.

Another important technical advantage of the present invention is that it provides separate mechanisms for a data path and a control path in routing packets. The data path is highly parallel, processing each packet flow independently to perform repetitive operations at high speeds for routing packets including complex modifications of the packets. The control path looks across data flows to implement the data path with the parallel processing so that complex routing operations are performed in an efficient manner at line speeds.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the figures, like numerals being used to refer to like and corresponding parts of the various drawings.

Building a service for a network presents a substantial task which is often time consuming and expensive. For instance, years often pass from the development and approval of a business case through the design and provisioning of a service on a network. The conventional development and provisioning of a service on a best effort network, such as the Internet or intranets that use TCP\IP, are difficult to design and deploy, typically requiring design from scratch and custom equipment. Even once a service is deployed on a best effort network, modification of the service over time presents a continuing problem.

One solution that eases the development and deployment of services on a best effort network is to deploy broadband network nodes on the edges of the network, such as the advanced traffic processor disclosed in U.S. patent application Ser. No. 09/875,639, filed Jun. 6, 2001, entitled "A System and Method for Allocating Bandwidth Across a Network," incorporated herein by reference. A broadband network node is a hardware device that processes network packet flows at line speeds at the ingress and egress points of an intranet. For instance, services are provisioned to the intranet by programming the broad band network nodes to classify, modify and shape packets to accomplish the desired service.

Figure 1:
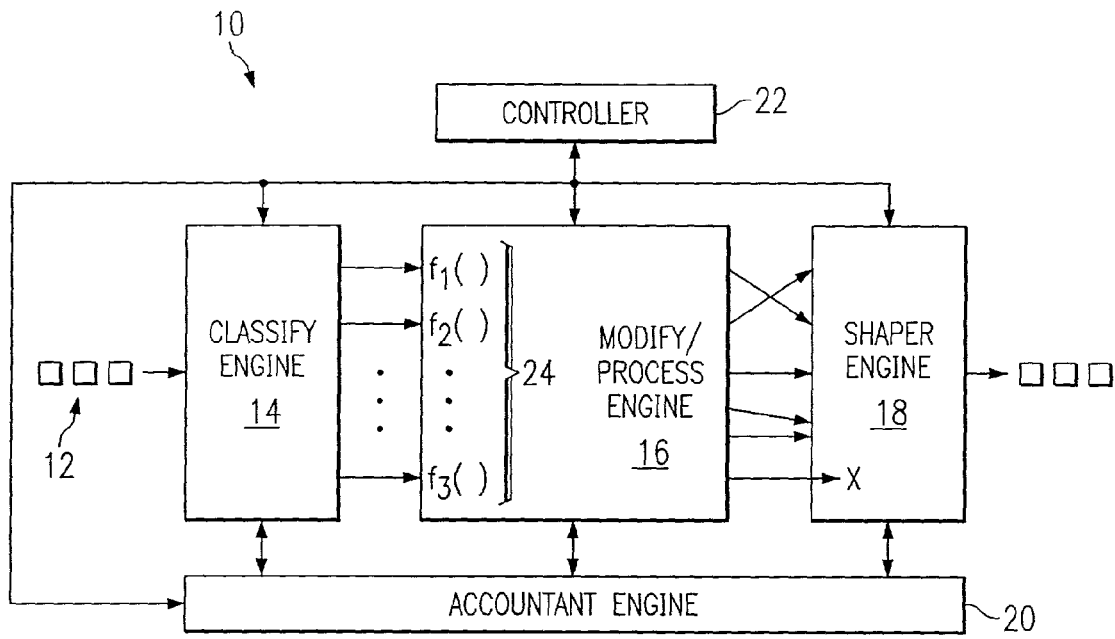
FIG. 1 depicts a block diagram of the logical architecture of a broadband network node.

Referring now to FIG. 1, a block diagram depicts the logical architecture of a broadband network node 10 for provisioning and operating a service on a best effort network. Generally, a service is a packet processing behavior or behaviors and associated billing rules which provides value to subscribers to the service. Broadband network node 10 provides packet processing behaviors through software that classifies, processes and shapes packet traffic flowing through broadband network node 10. Broadband network node 10 allows flexible and scalable deployment of services through software additions and modifications and, in some cases, the addition of hardware modules, that operate the service with separate data path and control path mechanisms. A highly parallel data path processes packet flows independently to perform repetitive operations at high speeds which reduce the impact of the service on network data transfer rates, while the control path performs more complex logic at lower speeds to allow control of one or more services by looking across data flows.

The data path mechanism is the flow of packets 12 through a classify engine 14, a modify\process engine 16 and a shaper engine 18. The data path mechanism uses a dataflow program which specifies a set of interconnected objects through which data flows and is processed. An accountant engine 20 tracks statistics in classify engine 14, modify\process engine 16 and shaper engine 18 to evaluate the data path usage and for billing purposes. The control path mechanism is established by controller 22 which interfaces with classify engine 14, modify\process engine 16, shaper engine 18 and accountant engine 20. Controller 22 programs the dataflow programs of each of the engines. For instance, installing or modifying rules in classify engine 14, installing or modifying functions in modify\process engine 16, establishing queues in shaper engine 18 and determining the variables to track in accountant engine 20. Controller 22 also controls the routing of the packets between the engines.

Classify engine 14 accepts inbound packets 12 and applies a set of classification rules in a well-defined order determined by controller 22 so that the first matching rule defines the packet group. Classification into packet groups is based on any part of the packet, including the datalink, network, and transport header fields as well as packet content or payload. For example, classify engine 14 groups packets based on VCI\VPI\CLP (ATM fields), IP source or destination addresses, port numbers, protocol type such as TCP or UDP, application protocol such as DNS, DHCP, HTTP, or the MIME content type such as text\html.

In one embodiment, classify engine 14 classifies groups of packets by flow statistics maintained by classify engine 14 or accountant engine 20, such as flow lifetime, average bandwidth, and peak bandwidth. For instance, classify engine 14 finds the flow to which a packet belongs, updates the flow statistics and then uses the flow statistics to classify the packet. In one application of this embodiment, a TCP flow greater than a predetermined age, such as 30 seconds old, is sent to a specific port.

In another embodiment, classify engine 14 creates a packet flow when a packet of a specific type of packet is detected, thus allowing flexible allocation of bandwidth. The network processor runs a program, such as a rules-based or a dataflow program, that is able to use reflective programming techniques to create a new reflective program able to classify desired packets. For instance, a dataflow program classifies packets according to the packet's control protocol, such as DHCP, DNS, FTP, SIP and other control protocols. The control protocol includes data that provides a basis for defining a new packet processing behavior to define a service, such port numbers, host names, user names, and IP addresses. The dataflow program extracts relevant data from the control protocol and uses reflective programming to create a new dataflow program that contains those parameters to define a service that classifies packets with the newly created dataflow program running on the network node.

One example of a service supported with reflective programming of programs includes a packet processing behavior of creating a new queue when a new TCP connection is established. Controller 22 programs a dataflow program associated with classify engine 14 to watch for TCP SYN requests associated with new TCP connections. When a SYN request is detected, the request is passed on to the appropriate port of modify/process engine 16 for transmission and also used to construct a new dataflow program by applying reflective programming techniques. Parameters of the SYN packet, such as IP source and destination address and port known as the host/port quadruple, are used to construct a new dataflow program. The new dataflow program creates a flow based on the host and port quadruples of the new TCP connection. The new TCP connection's dataflow program is added to classify engine 14 with an appropriate function added to modify/process engine 16. The reflective programming is accomplished by controller 22, which identifies a queue for the new TCP connection.

Other examples of services provided by reflective programming include services for classifying, modifying and shaping packets with FTP, DHCP and DNS control protocol data. For instance, for services related to FTP downloads, classify engine 14 monitors the FTP control channel until the parameters for the data connection, and then uses those parameters to dynamically construct a new dataflow program that gives FTP connections on the detected host port quadruple an appropriate class of service. As another example, the classify engine monitors DHCP requests and responses to extract the MAC-IP mapping for constructing rules based on IP addresses. This allows more efficient services where DHCP is used to dynamically assign IP addresses to computers of the network since 32 bit IP address are shorter than 48 bit MAC addresses. Similarly, the classify engine may monitor DNS requests and responses to allow creation through reflective programming of a new dataflow program that processes traffic according to IP address information. This advantageously allows dynamic creation of rules for a dataflow program based on DNS mappings, which is otherwise difficult to accomplish since the mapping of host name to IP address varies across the Internet.

Further, the reflective programming technique is able to provide services by creating dataflow programs with reflective programming that are in turn able to create new dataflow programs through the application of additional reflective programming. One example of multi-layered reflective programming is the monitoring of peer-to-peer downloads using a directory lookup service. For instance, Napster allows users to lookup at a central directory the IP addresses and port numbers for computers storing a specified song so that the user can connect to the computer and download the song. When a Napster request is detected, the Napster connection parameters are extracted and written into a first reflective program so that services, such as a blocking service, are provided by the reflective program based on classification using the host/port information. This first reflective program can be created with an ability to program a second reflective program. For instance, when the reflective program is created based on a Napster connection, the first reflective program looks for directory look-ups of specific songs and creates a second reflective program to block connection requests for certain specific predetermined songs. Thus, the second reflective program controls specific traffic associated with the first reflective program to allow more precise control of network traffic, such as identification of particular songs associated with a more general Napster connection.

Once classify engine 14 sorts packets into packet groups, each packet groups is sent to a specific input port of modify\process engine 16. Each input port of modify\process engine 16 has an associated function 24 that operates on the packets received at the associated ports. Modify\process engine 16 is a highly scalable, multi-threaded engine that processes packets according to the set of functions associated with the input ports so that internal state is not shared among functions, thus allowing a highly parallel implementation. Modify\process engine 16 is able to execute arbitrary programs on any packet to perform one of a variety of functions ranging from a non-operation in which the packet is passed unchanged to encapsulation or encryption of the packets.

Modify\process engine 16 sends packets to shaper engine 18 which controls the transmission of the packets to the network. Shaper engine 18 uses a variety of queuing disciplines to route the processed packets. For instance, shaper engine 18 can discard packets that are associated with an unauthorized use, can perform weighted fair queuing (WFQ) and leaky bucket queuing. Queuing of classified and processed packets by shaper engine 18 allows a broadband network node 10 to control packet flows across the network to achieve desired services.

By programming controller 22 to process predetermined packets, broadband network node 10 provides a flexible way to accomplish complex control with software programming. Although conventional routers are able to perform routing operations based on header fields that are at predefined offsets and fixed size, such routing is generally unable to perform complex classify and modify operations for enabling services. For instance, line speed operations on content of packets and high level state operations for multipacket flows or protocol interactions are not practical with conventional routers. To achieve the line speed complex processing of packets outlined in the logical architecture depicted by FIG. 1, one embodiment of the present invention redirects packets requiring complex processing to function specific processing blades.

Figure 2:
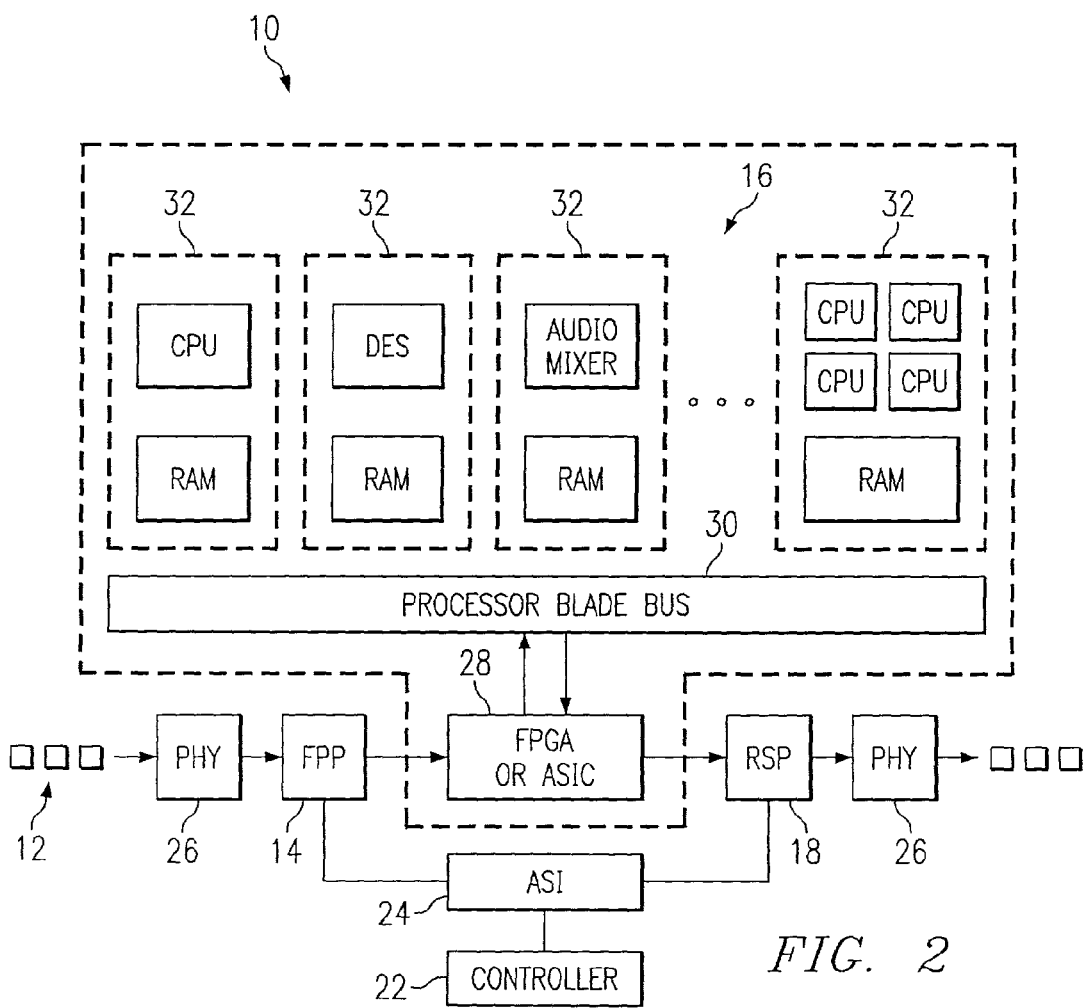
FIG. 2 depicts a block diagram of a hardware architecture for modifying packets with a processing blade architecture.

Referring now to FIG. 2, a block diagram depicts a hardware architecture for a broadband network node 10 which is programmable to perform the logical functions depicted by FIG. 1. Packets 12 flow to physical interface 26 and classify engine 14, which is a fast pattern processor from AGERE that is able to classify the packets. Once the packets are classified, they pass to a modify\process engine 16 which performs the set of functions based on the classification of classify engine 14. Modify\process engine 16 is a hardware interface 28 that interfaces with a processor blade bus 30 and one or more processor blades 32. Processor blade interface 28 is an FPGA or ASIC that passes packets received from classify engine 14 to either processor blade bus 30 or shaper engine 18, which is a routing switch processor from AGERE. Processor blade interface 28 performs functions based on classification or forwards packets to processor blades 32 based on classifications and the complexity of the function. For instance, to enable voice over internet protocol, conference calls, a processing blade 32 with an audio mixer accepts packets forwarded from processor blade interface 28 through processor blade bus 30 and performs audio mixing functions for the conference call. The packets are then forwarded back to processor blade interface 28 and on to shaper engine 18 for transmission through physical interface 26 to the network.

One advantage of the processor blade architecture is that the broadband network node 10 is extremely scalable and able to add services by inserting a supporting hardware module. Complex operations on packets associated with processor blades do not slow the transfer rate of other packets since the processor blade architecture horizontally scales to one processing blade for each flow in the network. Some examples of services of varying degrees of complexity that may be performed with network processors or with processor blades include:

services are easily added with modular hardware. Some examples of general purpose or specialized engines supported by processing blades 32 include encryption, audio mixing, water marking, transcoding, filtering and searching.

Although the present invention has been described in detail, it should be understood that various changes, substitutions and alterations can be made hereto without departing from the spirit and scope of the invention as defined by the appending claims.

What is claimed is:

1. A broadband Internet node comprising:
   a classify engine interfaced with the Internet, the classify engine operable to accept packets from the Internet and determine classification information for each packet, wherein the classify engine is operable to detect a SYN packet associated with a new TCP connection;
   a modify/process engine interfaced with the classify engine, the modify/process engine having plural ports, each port having an associated function; and
   a controller interfaced with the classify engine and the modify/process engine, the controller programming the classify engine to route each packet to a predetermined port of the modify/process engine based on the classification information of the packet;
   wherein the controller programs the classify engine with a dataflow program that determines classification information for the packets and detects the host/port quadruple of the new TCP connection and creates a new queue for the new TCP connection.

2. The node of claim 1 wherein the classify engine is further operable to detect packets associated with an FTP data stream and the controller is further operable to program

| Complexity (processing power) | Applications | Operations | | |
|---|---|---|---|---|
| | | Classify | Modify/Process | Account |
| Low | Routing<br>Switching<br>Firewall (based on ports)<br>VLAN mapping<br>Tiered Services<br>Content Broker (based on IP addr)<br>FAP<br>Load Balancing | MAC Addr (scr/dest)<br>UO Addr (scr/dest)<br>ATM VCI/VPI, CLP<br>Type of Service (TOS) field<br>Transport (i.e., UDP, TCP, RTP)<br>Port number (scr/dest) | Change MAC addr<br>Add/Modify MPLS field (layer 2.5)<br>Change IP address<br>Change VCI/VPI<br>Change Diffserv priority field<br>Change TOS field<br>Change Time to Live (TTL) field<br>Layer 2 Protocol Switching (i.e. ATM to Ethernet) | Number of bytes transferred<br>Number of bytes received<br>Bytes per second<br>(average, peak, sustained) |
| Moderate | Application to QoS mapping<br>Admission Control<br>Content Broker (based on URL)<br>NetEx (bandwidth on demand) | Application (i.e., HTTP, Napster, Realmedia) based on port number<br>URL/Cookie<br>Data type (i.e. MIME encoding)<br>Content checking (i.e., names in XML, email headers) | Add/Delete/Modify IP or protocol Options field<br>Re-compute and apply padding<br>Re-compute and apply Header and/or Protocol Checksum<br>Protocol Scraping (i.e., DHCP) | Number of sessions<br>Number of sessions by application (i.e., audio streams, VoIP)<br>Start/Stop times of sessions<br>URL/Cookie tracking |
| High | Content Broker (w/redirection)<br>Digital Rights Management<br>Virus Detection<br>Carnivore | CDN URL redirection<br>Content Filtering<br>Virus scanning<br>Digital Rights Classification | Encapsulation<br>IPSec Encryption<br>Digital Rights Watermarking | Content tracking (i.e., VoD, Carnivore) Content tracking (i.e., VoD, Carnivore) |

By having these services selectively provided through software programming or a combination of programming and the insertion of processing blades to achieve a desired performance level for a service. Processing performance scales linearly with the number of processing blades 32. Each processing blade is able to have either a general purpose CPU or specifically designed hardware for desired functions, such as encryption or audio mixing, so that new the classify engine with a new dataflow program that classifies the FTP data stream according to the host/port quadraple of the FTP connection.

3. The node of claim 1 wherein the classify engine is further operable to monitor DHCP requests and responses to extract MAC and IP address mapping, and the controller is further operable to program the classify engine with rules to control traffic with IP address information.

4. The node of claim 1 wherein the classify engine is further operable to monitor DNS requests and responses to associate traffic with an IP address and the controller is further operable to program the classify engine with rules to control traffic with IP address information.

5. A method for routing Internet packets, the method comprising:
   classifying the packets into one or more packet flows according to classification rules;
   routing each packet flow to a predetermined port of a processor, each port having an associated function, so that the packets flow through the processor as a data path;
   programming the classification rules and functions through a control path that looks across packet flows of the data path;
   detecting a new packet type; and
   performing reflective programming on a dataflow program to classify the new packet type;
   wherein the new packet type comprises a new TCP connection, detecting comprises detecting a SYN packet associated with the new TCP connection, and performing reflective programming comprises programming a dataflow program that classifies the host/port quadruple of the new TCP connection.

\* \* \* \* \*